United States Patent Office 3,649,617
Patented Mar. 14, 1972

3,649,617
2-SUBSTITUTED AMINO-5-PHENYL-3H-1,4-
BENZODIAZEPINES
Jackson Boling Hester, Jr., Galesburg, Mich., assignor to
The Upjohn Company, Kalamazoo, Mich.
No Drawing. Continuation-in-part of application Ser. No.
803,450, Feb. 28, 1969. This application July 20, 1970,
Ser. No. 56,750
Int. Cl. C07d 29/28, 53/06
U.S. Cl. 260—239 BD     13 Claims

ABSTRACT OF THE DISCLOSURE 3H-1,4-benzodiazepines of the Formula II:

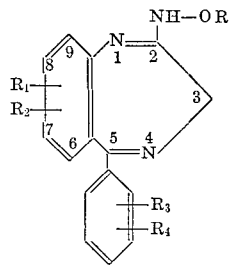

wherein R is selected from the group consisting of hydrogen, lower-alkyl of 1 to 4 carbon atoms, inclusive, alkenyl of 3 or 4 carbon atoms, benzyl, —CH$_2$—COOH and —(CH$_2$)$_2$—COOH and the esters thereof derived from an alkanol of 1 to 3 carbon atoms, inclusive, and

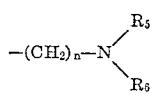

in which $n$ is 2 or 3 and R$_5$ and R$_6$ are lower-alkyl of 1 to 4 carbon atoms, inclusive, or R$_5$ and R$_6$ together are alkylene of 4 or 5 carbon atoms; and wherein R$_1$, R$_2$, R$_3$ and R$_4$ are selected from the group consisting of hydrogen, alkyl defined as above, thioalkyl in which alkyl is defined as above, lower alkoxy of 1 to 3 carbon atoms, inclusive, halogen, nitro, cyano and —CF$_3$; are prepared by condensing the corresponding thiolactam Compound I:

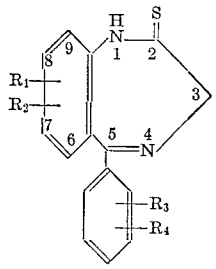

with a compound of the formula H$_2$N—OR in which R is defined as above. These compounds and their pharmacologically acceptable acid addition salts have sedative and tranquilizing action and can be used in mammals and birds as tranquilizers.

CROSS REFERENCES TO RELATED APPLICATION

This application is a continuation-in-part of application Ser. No. 803,450, filed Feb. 28, 1969 and now abandoned.

BACKGROUND OF THE INVENTION

Field of the invention

This invention is directed to new organic compounds and is particularly concerned with novel 3H-1,4-benzodiazepines and a process for the production thereof.

The novel compounds and the process of production therefor can be illustratively represented as follows:

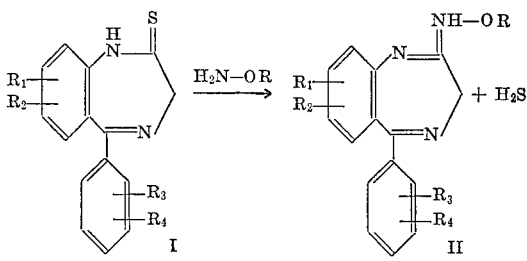

wherein R is selected from the group consisting of hydrogen, alkyl of 1 to 4 carbon atoms, inclusive, alkenyl of 3 or 4 carbon atoms, benzyl, —CH$_2$—COOH and —(CH$_2$)$_2$COOH and the esters thereof derived from an alkanol with 1 to 3 carbon atoms, inclusvie, and

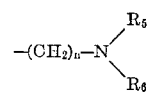

in which $n$ is 2 or 3 and R$_5$ and R$_6$ are lower-alkyl of 1 to 4 carbon atoms, inclusive, or R$_5$ or R$_6$ together are alkylene of 4 to 5 carbon atoms; and wherein R$_1$, R$_2$, R$_3$ and R$_4$ are selected from the group consisting of hydrogen, alkyl defined as above, thioalkyl in which the alkyl group is defined as above, alkoxy of 1 to 3 carbon atoms, inclusive, halogen, nitro, cyano and —CF$_3$.

The process of this invention comprises heating a thiolactam of Formula I above with an oxylamine H$_2$N—OR in which R is defined as above in an organic solvent or suspending agent to about 60–80° C. for 2 to 18 hours.

DESCRIPTION OF THE PREFERRED EMBODIMENT

Lower-alkyl groups of 1 to 4 carbon atoms, inclusive, are exemplified by methyl, ethyl, propyl, isopropyl, butyl, sec.-butyl, isobutyl and tert.-butyl.

Examples fo alkenyl of 3 to 4 carbon atoms are allyl, 2-methylallyl, 2-butenyl (crotyl), 3-butenyl and the like.

Examples of the radical

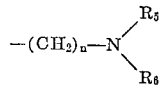

are 2-(dimethylamino)ethyl, 2-(diethylaminoethyl), 2-(dipropylamino)ethyl, 3-(dimethylamino)propyl, 3-piperidinopropyl, 2-pyrrolidinoethyl, 2-piperidinoethyl and the like.

The term "halogen" for R$_1$, R$_2$, R$_3$ and R$_4$ means fluoro, chloro and bromo.

The novel compounds of the Formula II including pharmacologically acceptable acid addition salts thereof have sedative and tranquilizing effects in mammals and birds.

The pharmacologically acceptable acid addition salts of compounds of Formula II contemplated in this invention are the hydrochlorides, hydrobromides, hydriodides, sulfates, phosphates, acetates, lactates, tartrates, citrates, salicylates, succinates, malates, maleates, pamoates, cyclohexanesulfamates, methanesulfonates and the like, prepared by reacting a compound of Formula II with the stoichiometrically calculated amount of the selected pharmacologically acceptable acid.

Illustratively, sedative effects of 2-(methoxyamino)-7-chloro-5-phenyl-3H-1,4-benzodiazepine are shown by the following tests in mice:

*Chimney test* [Med. Exp. 4, 11 (1961)]: The effective intraperitoneal dosage for 50% of mice, $ED_{50}$, is 28 mg./kg. The test determines the ability of mice to back up and out of a vertical glass cylinder within 30 seconds. At the effective dosage, 50% of the mice failed doing it.

*Dish test*: Mice in Petri dishes (10 cm. diameter, 5 cm. high, partially embedded in wood shavings), climb out in a very short time, when not treated. If mice remain in the dish for more than 3 minutes, it indicates tranquilization. $ED_{50}$ equals the effective dosage of test compound at which 50% of the mice remain in the dish. $ED_{50}$ (intraperitoneal administration) in this test was 2–3 mg./kg.

*Pedestal test:* The untreated mouse leaves the pedestal in less than one minute to climb back to the floor of the standard mouse box. Tranquilized mice will stay more than one minute. $ED_{50}$ (intraperitoneal administration) was 16 mg./kg.

*Nicotine antagonism test:* Mice in a group of 6 were injected intraperitoneally with 2-(methoxyamino-7-chloro-5-phenyl-3H-1,4-benzodiazepine. Thirty minutes later the mice including control (untreated) mice are injected with 2 mg./kg. nicotine salicylate. The control mice show over-stimulation, i.e., (1) running convulsions followed by (2) tonic extensor fits; followed by (3) death. An intraperitoneal dosage of 2–4 mg./kg. of the test compound protected 50% or the mice against (2) and (3) ($ED_{50}$); oral $ED_{50}$ was 1.4 mg./kg.

The compounds, 2 - [(allyloxy)amino] - 7-nitro-5-(o-chlorophenyl) - 3H - 1,4 - benzodiazepine (A) and 2-[(2-alloyloxyamino - 7 - chloro - 5 - (o-chlorophenyl-3H-1,4-benzodiazepine (B) were tested in tests as described above with these results:

| Compound | $ED_{50}$ in mg./kg. | | | | |
|---|---|---|---|---|---|
| | Chim. | Dish | Ped. | Nic. 2 | Nic. 3 |
| (A) | 8 | 5 | 7 | 0.56 | 0.8 |
| (B) | 2.8 | 3.5 | 4 | 0.8 | 0.8 |

NOTE.—Chim.=Chimney test; Dish=Dish test; Ped.=Pedestal test; Nic. 2=Nicotine antagonism-tonic extensor fits (2); Nic. 3=Nicotine antagonism-death (3).

The pharmaceutical forms contemplated by this invention include pharmaceutical compositions suited for oral, parenteral and rectal use, e.g., tablets, oils, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Oil, e.g., coconut oil, sesame oil, safflower oil, cottonseed oil, peanut oil may be used for preparing solutions or suspensions of the active drug. Sweetening, coloring and flavoring agents may be added.

For mammals and birds food premixes, with starch, oatmeal, dried fishmeal, fishmeal, flour and the like can be prepared.

As tranquilizer the compounds of Formula II can be used in dosages of 1–50 mg./kg. in oral or injectable preparations as described above, to alleviate tension and anxiety in mammals or birds, such as, e.g., occurs when animals are in travel.

Other acid addition salts of the compounds of Formula II can be made such as the fluosilicic acid addition salts which are useful mothproofing compounds or the trichloroacetates useful as herbicides against Johnson grass, Bermuda grass, yellow foxtail and green foxtail, and quack grass.

Starting materials of Formula I of this invention, substituted or unsubstituted 1,3-dihydro-5-phenyl-2H-1,4-benzodiazepine-2-thiones, and methods for their preparation, are described by G. Archer and L. H. Sternbach, J. Org. Chem. 20, 231 (1964); see also U.S. Pat. 3,422,091. These compounds (I) are prepared by heating substituted or unsubstituted 1,3-dihydro-5-phenyl-2H-1,4-benzodiazepine-2-ones and phosphorus pentasulfide in pyridine for about 45 minutes (Archer et al., ibid; U.S. Pat. 3,422,091). The following compounds of Formula I are representative starting products:

1,3-dihydro-5-phenyl-2H-1,4-benzodiazepine-2-thione;
7-chloro-1,3-dihydro-5-phenyl-2H-1,4-benzodiazepine-2-thione;
7-bromo-1,3-dihydro-5-phenyl-2H-1,4-benzodiazepine-2-thione;
7-methyl-1,3-dihydro-5-phenyl-2H-1,4-benzodiazepine-2-thione;
7-nitro-1,3-dihydro-5-phenyl-2H-1,4-benzodiazepine-2-thione;
7-fluoro-1,3-dihydro-5-phenyl-2H-1,4-benzodiazepine-2-thione;
7-trifluoromethyl-1,3-dihydro-5-phenyl-2H-1,4-benzodiazepine-2-thione;
7-cyano-1,3-dihydro-5-phenyl-2H-1,4-benzodiazepine-2-thione;
7-chloro-1,3-dihydro-5-(o-chlorophenyl)-2H-1,4-benzodiazepine-2-thione;
7-chloro-1,3-dihydro-5-(o-fluorophenyl)-2H-1,4-benzodiazepine-2-thione;
7-bromo-1,3-dihydro-5-(o-fluorophenyl)-2H-1,4-benzodiazepine-2-thione;
7-fluoro-1,3-dihydro-5-(o-fluorophenyl)-2H-1,4-benzodiazepine-2-thione;
7-nitro-1,3-dihydro-5-(o-chlorophenyl)-2H-1,4-benzodiazepine-2-thione;
7-bromo-1,3-dihydro-5-(o-bromophenyl)-2H-1,4-benzodiazepine-2-thione;
7-methyl-1,3-dihydro-5-(o-chlorophenyl)-2H-1,4-benzodiazepine-2-thione;
7-cyano-1,3-1dihydro-5-(o-chlorophenyl)-2H-1,4-benzodiazepine-2-thione;
7-trifluoromethyl-1,3-dihydro-5-(o-chlorophenyl)-2H-1,4-benzodiazepine-2-thione;
7-fluoro-1,3-dihydro-5-(o-chlorophenyl)-2H-1,4-benzodiazepine-2-thione;
1,3-dihydro-5-(o-chlorophenyl)-2H-1,4-benzodiazepine-2-thione;
1,3-dihydro-5-(2,6-dichlorophenyl)-2H-1,4-benzodiazepine-2-thione;
1,3-dihydro-5-(2,6-difluorophenyl)-2H-1,4-benzodiazepine-2-thione;
7,9-dichloro-1,3-dihydro-5-(2,6-dichlorophenyl)2H-1,4-benzodiazepine-2-thione;
6,7-dicyano-1,3-dihydro-5-(m-nitrophenyl)-2H-1,4-benzodiazepine-2-thione;
6-methyl-7-bromo-1,3-dihydro-5-(p-methylphenyl)-2H-1,4-benzodiazepine-2-thione;
7-trifluoromethyl-8-cyano-1,3-dihydro-5-(2-chloro-5-methylphenyl)-2H-1,4-benzodiazepine-2-thione;
7,9-dicyano-1,3-dihydro-5-(2,4-dibromophenyl)-2H-1,4-benzodiazepine-2-thione;
6,8-dimethyl-1,3-dihydro-5-(3,5-diethoxyphenyl)-2H-1,4-benzodiazepine-2-thione;

and the like.

In carrying out the process of the invention, a selected 1,3-dihydro-5-phenyl-2H-1,4-benzodiazepine-2-thione (I), an oxyamine of formula $H_2N$—OR in which R is defined as above, usually in the form of a salt such as hydrochloride or hydrobromide, a base e.g. carbonate, bicarbonate, or hydroxides of alkali metals to absorb the acid moiety of the oxyamine salt and a solvent are refluxed for a period of 2–18 hours. In the preferred embodiment of this invention, the organic solvent used may be methanol, ethanol, 2-propanol, or such co-solvents as methanol-dimethyl sulfoxide, or the like. The oxyamine is usually used in excess, such as from 1.5 to 5 times the molar equivalent of the thione starting material. The base is used in sufficient quantity to produce the oxyamine in the free base state. After the reaction is terminated, the mixture is filtered, the filtrate concentrated in vacuo and the product obtained by standard procedures such as extraction, crystallization, recrystallization and chromatography to give the pure product, a 2-(oxyamino)-5-phenyl-3H-1,4-benzodiazepine of Formula II.

The following examples are illustrative of the processes and products of the present invention, but are not to be construed as limiting.

EXAMPLE 1

2-(methoxyamino)-7-chloro-5-phenyl-3H-1,4-benzodiazepine

A mixture of 45.6 g. (0.160 mole) of 7-chloro-1,3-dihydro-5-phenyl-2H-1,4-benzodiazepine-2-thione, 26.7 g. of methoxyamine hydrochloride, 26.9 g. of sodium bicarbonate and 800 ml. of methanol was refluxed under nitrogen for 5.5 hours, cooled and filtered. The filtrate was concentrated in vacuo to give a residue. A solution of the residue in methylene chloride was absorbed on a 3 kg. silica gel column which had been prepared with methylene chloride. The column was then eluted with 30% ethyl acetate-70% cyclohexane; 400 ml. fractions were collected. Unreacted starting material was eluted in fractions 15–32. The product was eluted in fractions 42–85 and was crystallized from ethyl acetate to give 29.8 g. (62.3%) of 2-(methoxyamino)-7-chloro-5-phenyl-3H-1,4-benzodiazepine of melting point 184.5–186° C. The analytical sample of melting point 185–186° C. was prepared recrystallizing this material from methanol. The ultraviolet spectrum (ethanol) had $\lambda_{max}$ 212, 253 and 343 m$\mu$ ($\epsilon$=33,800, 26,850 and 2,850, respectively) and an inflection at 227 m$\mu$ ($\epsilon$=25,950).

Analysis.—Calcd. for $C_{16}H_{14}ClN_3O$ (percent): C, 64.11; H, 4.71; Cl, 11.83; N, 14.02. Found (percent): C, 63.84; H, 4.71; Cl, 12.17; N, 13.91.

EXAMPLE 2

2-(benzyloxyamino)-7-chloro-5-phenyl-3H-1,4-benzodiazepine

A mixture of 1.43 g. (0.005 mole) of 7-chloro-1,3-dihydro-5-phenyl-2H-1,4-benzodiazepine-2-thione, 1.60 g. (0.01 mole) of benzyloxyamine hydrochloride, 0.84 g. (0.01 mole) sodium bicarbonate and 50 ml. of methanol was refluxed for 10 hours, cooled and filtered. The solid was recrystallized from methanol to give 1.02 g. (54%) of 2-(benzyloxyamino)-7-chloro-5-phenyl-3H-1,4-benzodiazepine of melting point 178–181.5° C. The analytical sample, melting point 180–181.5° C., was prepared by recrystallizing this material from methanol. The ultraviolet spectrum (ethanol) had a $\lambda_{max}$ 209, 254 and 343 m$\mu$ ($\epsilon$=33,100, 28,800 and 1,950, respectively) with an inflection at 230 m$\mu$ ($\epsilon$=26,450).

Analysis.—Calcd. for $C_{22}H_{18}ClN_3O$ (percent): C, 70.30; H, 4.85; Cl, 9.43; N, 11.18. Found (percent): C, 70.12; H, 5.06; Cl, 9.46; N, 11.32.

EXAMPLE 3

2-[2-(1-pyrrolidinyl)ethoxyamino]-7-chloro-5-phenyl-3H-1,4-benzodiazepine and hydrate thereof A mixture of 2.87 g. (0.01 mole) of 7-chloro-1,3-dihydro-5-phenyl-2H-1,4-benzodiazepine-2-thione, 4.06 g. (0.02 mole) of 2-(1-pyrrolidinyl)ethoxyamine dihydrochloride, 3.36 g. (0.04 mole) of sodium bicarbonate and 100 ml. of methanol was refluxed under nitrogen for 2 hours, cooled and filtered. The filtrate was concentrated in vacuo and the thus-obtained residue was crystallized from ethyl acetate to give 1.69 g. (44.3%) of 2-[2-1-pyrrolidinyl)ethoxyamino]-7-chloro-5-phenyl-3H-1,4-benzodiazepine as hydrate, of melting point 122.5–130° C. The analytical sample of melting point 137.5–138.5° C. was prepared by recrystallizing some of this material from ethyl acetate. The ultraviolet spectrum (ethanol) had $\lambda_{max}$ 212, 254 and 345 m$\mu$ ($\epsilon$=32,100, 25,850 and 1,950, respectively) with an inflection at 228 m$\mu$ ($\epsilon$=24,650).

Analysis.—Calcd. for $C_{21}H_{23}ClN_4O \cdot H_2O$ (percent): C, 62.91; H, 6.29; Cl, 8.85; N, 13.98; $H_2O$, 4.49. Found (percent): C, 63.19; H, 6.24; Cl, 9.22; N, 13.57; $H_2O$, 3.54.

Heating this hydrate to 110° C. for 72 hours at 15 mm. Hg pressure gave water-free 2-[2-(1-pyrrolidinyl)ethoxyamino]-7-chloro-5-phenyl-3H-1,4-benzodiazepine.

EXAMPLE 4

2-(butoxyamino)-7-chloro-5-phenyl-3H-1,4-benzodiazepine

A mixture of 1.43 g. (0.005 mole) of 7-chloro-1,3-dihydro-5-phenyl-2H-1,4-benzodiazepine-2-thione, 1.26 g. (0.01 mole of t-butoxyamine hydrochloride, 0.85 g. (0.01 mole) of sodium bicarbonate and 50 ml. of methanol was refluxed under nitrogen for 6 hours. At this time very little reaction could be detected by thin layer chromatography. Dimethyl sulfoxide (5 ml.) was added, and this mixture was refluxed for 7 hours, cooled and filtered. The resulting solid was recrystallized from ethyl acetate to give 0.24 g. (14%) of 2-(t-butoxyamino)-7-chloro-5-phenyl-3H-1,4-benzodiazepine of melting point 252° C. (dec.). The analytical sample of melting point 251.5–252° C. (dec.) was prepared by recrystallzing this material from ethyl acetate. The ultraviolet spectrum (ethanol) had $\lambda_{max}$ 212, 254 and 346 m$\mu$ ($\epsilon$=35,400, 24,850 and 1,900 respectively).

Analysis.—Calcd. for $C_{19}H_{20}ClN_3O$ (percent): C, 66.76; H, 5.90; Cl, 10.37; H, 12.29. Found (percent): C, 66.77; H, 5.94; Cl, 10.66; N, 12.29.

EXAMPLE 5

2-(allyloxyamino)-7-chloro-5-phenyl-3H-1,4-benzodiazepine

A mixture of 2.87 g. (0.01 mole) of 7-chloro-1,3-dihydro-5-phenyl-2H-1,4-benzodiazepine-2-thione, allyloxyamine hydrochloride (2.20 g.; 0.02 mole), sodium bicarbonate (1.77 g.; 0.021 mole) and absolute ethanol was refluxed for 4.5 hours with a slow stream of nitrogen bubbling through the reaction mixture. The reaction mixture was cooled and filtered, the filtrate was concentrated in vacuo and the residue was chromatographed on silica gel (300 g.) with 10% ethyl acetate-90% methylene chloride; 100-ml. fractions were collected. The product was eluted in fractions 30–62 and crystallized from ether-Skellysolve B hexanes to give 1.19 g. of 2-(allyloxyamino)-7-chloro-5-phenyl-3H-1,4-benzodiazepine of melting point 126.5–129° C. The analytical sample had a melting point of 134–135.5° C. The ultraviolet spectrum (ethanol) had $\lambda_{max}$ 211 ($\epsilon$=34,550), 254 ($\epsilon$=27,350), 343 ($\epsilon$=1,850), inflection 229 m$\mu$ ($\epsilon$=25,900).

Analysis.—Calcd. for $C_{18}H_{16}ClN_3O$ (percent): C, 66.36; H, 4.95; Cl, 10.88; N, 12.90. Found (percent): C, 66.20; H, 4.95; Cl, 11.12; N, 12.43.

EXAMPLE 6

2-[2-(diethylamino)ethoxyamino]-7-chloro-5-phenyl 3H-1,4-benzodiazepine and hemihydrate thereof A mixture of 4.3 g. (0.015 mole) of 7-chloro-1,3-dihydro-5-phenyl-2H-1,4-benzodiazepine-2-thione, 2-(diethylamino)ethoxyamine (3.96 g.; 0.030 mole) and absolute ethanol (150 ml.) was refluxed, under nitrogen, for 7 hours and concentrated in vacuo. The residue was crystallized from ethyl acetate-Skellysolve B hexanes to give 5.25 g. (91%) of 2-[2-(diethylamino)ethoxyamino]-7-chloro-5-phenyl-3H-1,4-benzodiazepine as hemihydrate of melting point 92–100° C. The analytical sample had a melting point of 99–100° C. The ultraviolet spectrum (ethanol) had $\lambda_{max.}$ 211 ($\epsilon$=33,850), 254 ($\epsilon$=25,650), 344 ($\epsilon$=2,000), inflection 227 m$\mu$ ($\epsilon$=25,600).

*Analysis.*—Calcd. for $C_{21}H_{25}ClN_4O.1/2H_2O$ (percent): C, 64.03; H, 6.65; Cl, 9.00; N, 14.22. Found (percent): C, 63.93; H, 6.60; Cl, 9.02; N, 13.85.

Heating this hydrate to 80° C. for 72 hours at 15 mm. Hg pressure gave water-free 2-[2-(diethylamino)ethoxyamino]-7-chloro-5-phenyl-3H-1,4-benzodiazepine.

EXAMPLE 7

*Ethyl [(7-chloro-5-phenyl-3H-1,4-benzodiazepin-2-yl)aminooxy]acetate*

A mixture of 11.5 g. (0.04 mole) of 7-chloro-1,3-dihydro - 5 - phenyl-2H-1,4-benzodiazepine-2-thione, ethyl aminooxyacetate (11.9 g.; 0.10 mole), dimethyl sulfoxide (40 ml.) and absolute ethanol (400 ml.) was refluxed for 7 hours with a stream of nitrogen bubbling through the mixture. Additional ethyl aminooxyacetate (6.0 g.) was added to the mixture which was refluxed for an additional 18 hours and concentrated in vacuo. The residue was suspended in water and the mixture was extracted with ether. The ether extract was dried over anhydrous potassium carbonate and concentrated to give a residue. The residue was chromatographed on silica gel (750 g.) with 25% ethyl acetate-75% cyclohexane; 200-ml. fractions were collected. The product of fractions 30–56 was crystallized from ether-Skellysolve B hexanes to give 2.59 g. of melting point 116–117° C. and 2.07 g. of melting point 113–115.5° C. of ethyl [(7-chloro-5-phenyl-3H-1,4-benzodiazepin - 2 - yl)aminooxy]acetate. The analytical sample had a melting point of 113–114° C. The ultraviolet spectrum (ethanol) had $\lambda_{max.}$ 210 ($\epsilon$=34,560, 252 ($\epsilon$=28,150), 341 ($\epsilon$=2,050), inflection 228 m$\mu$ ($\epsilon$=26,300).

*Analysis.*—Calcd. for $C_{19}H_{18}ClN_3O_3$ (percent): C, 61.37; H, 4.88; Cl, 9.54; N, 11.30. Found (percent): C, 61.48; H, 5.14; Cl, 9.55; N, 11.17.

EXAMPLE 8

*2-(hydroxyamino)-7-chloro-5-phenyl-3H-1,4-benzodiazepine*

A mixture of 14.4 g. (0.05 mole) of 7-chloro-1,3-dihydro-5-phenyl-2H-1,4-benzodiazepine-2-thione, hydroxylamine hydrochloride (4.55 g.), sodium bicarbonate (5.45 g.) and methanol (250 ml.) was refluxed for 1.5 hours with a stream of nitrogen bubbling through the mixture. The cooled mixture was filtered and the filtrate was concentrated in vacuo to give a residue. This residue was chromatographed on silica gel (750 g.); 150-ml. fractions were collected. The product was eluted with 2% triethylamine-13% methanol-85% ethyl acetate and crystallized from ethyl acetate to give 4.92 g. of melting point 122.5–130° C. and 3.38 g. of melting point 128–132° C. of 2-(hydroxyamino)-7-chloro-5-phenyl-3H-1,4-benzodiazepine. The analytical sample had a melting point of 126–130° C. The ultraviolet spectrum (ethanol) had $\lambda_{max.}$ 209 ($\epsilon$=34,050), 252 ($\epsilon$=23,750), 345 ($\epsilon$=1,800), inflection 229 m$\mu$ ($\epsilon$=24,250).

*Analysis.*—Calcd. for $C_{15}H_{12}ClN_3O$ (percent): C, 63.05; H, 4.23; Cl, 12.41; N, 14.71. Found (percent): C, 63.13; H, 4.40; Cl, 12.31; N, 14.52.

EXAMPLE 9

*2-(allyloxyamino)-7-chloro-5-(o-chlorophenyl)-3H-1,4-benzodiazepine*

A mixture of 7-chloro-1,3-dihydro-5-(o-chlorophenyl)-2H-1,4-benzodiazepine-2-thione (1.52 g., 0.005 mole), allyloxyamine hydrochloride (1.10 g., 0.01 mole), sodium bicarbonate (0.89 g., 0.011 mole) and absolute ethanol (50 ml.) was refluxed for 5 hours with a slow stream of nitrogen bubbling through the reaction mixture. The mixture was cooled and filtered, and the filtrate was concentrated in vacuo. Crystallization of the residue from ethyl acetate gave 0.21 g. of recovered starting material, chromatographing the mother liquors on silica gel (100 g.) with 25% ethyl acetate-75% cyclohexane. Crystallization from ethyl acetate-Skellysolve B hexanes gave 0.68 g. (37.8%) of 2 - (allyloxyamino) - 7-chloro-5-(o-chlorophenyl)-3H-1,4-benzodiazepine, melting point 130–131° C. The analytical sample, melting point 130–131° C. was prepared by recrystallizing some of this material from ethyl acetate-Skellysolve B hexanes. The ultraviolet spectrum (ethanol) had $\lambda_{max.}$ 234 and 346 m$\mu$ ($\epsilon$=26,950 and 2,150, respectively) with inflections at 208, 253 and 275 m$\mu$ ($\epsilon$=38.750, 21,160 and 10,750, respectively).

*Analysis.*—Calcd. for $C_{18}H_{15}Cl_2N_3O$ (percent): C, 60.01; H, 4.20; Cl, 19.68; N, 11.66. Found (percent): C, 59.88; H, 4.29; Cl, 19.40; N, 11.41.

EXAMPLE 10

*2-(methoxyamino)-7-chloro-5-(o-chlorophenyl)-3H-1,4-benzodiazepine*

A solution of 7-chloro-1,3-dihydro-5-(o-chlorophenyl)-2H-1,4-benzodiazepine-2-thione (7.42 g., 0.0244 mole) in a mixture of 1 N sodium hydroxide solution (28.9 ml.) and methanol (36 ml.) was treated during 20 minutes with a solution of dimethyl sulfate (3.35 g.) in methanol (12 ml.). This mixture was stirred for 10 minutes, diluted with water, made strongly alkaline with sodium hydroxide and extracted with ether. The extract was washed with water, dried with anhydrous potassium carbonate and concentrated. The residue was chromatographed on silica gel (500 g.) with 25% ethyl acetate-75% cyclohexane. The resulting product was crystallized from ether at 0° C. to give 3.71 g. (45%) of 7-chloro-2-(methylthio) - 5 - (o-chlorophenyl)-3H-1,4-benzodiazepine of melting point 113–118.5° C. The analytical sample of melting point 118–120° C. was prepared by recrystallizing some of this material from methylene chloride-ether. The ultraviolet spectrum (ethanol) had $\lambda_{max.}$ 244 and 286 m$\mu$ ($\epsilon$=23,600 and 11,500, respectively) with inflections at 215 and 330 m$\mu$ ($\epsilon$=30,350 and 3,650, respectively).

*Analysis.*—Calcd. for $C_{16}H_{12}Cl_2N_2S$ (percent): C, 57.32; H, 3.61; Cl, 21.15; N, 8.36; S, 9.57. Found (percent): C, 57.82; H, 3.77; Cl, 21.37; N, 8.44; S, 8.97.

A mixture of 7-chloro-2-(methylthio)-5-(o-chlorophenyl)-3H-1,4-benzodiazepine (1.60 g.; 0.00476 mole), methoxyamine hydrochloride (0.794 g.), sodium bicarbonate (0.794 g.) and absolute ethanol (50 ml.) was refluxed for 4 hours with a slow stream of nitrogen flowing through the reaction mixture. This mixture was concentrated in vacuo; the residue was mixed with water and extracted with methylene chloride. The extract was washed with water, dried with anhydrous potassium carbonate and concentrated. Crystallization of the residue from ethyl acetate gave 1.11 g. (70%) of 2-methoxyamino)-7-chloro-5-(o - chlorophenyl)3H-1,4-benzodiazepine, melting point 157–159° C. The analytical sample, melting point 158.5–159.5° C. was prepared by recrystallizing this material from ethyl acetate. The ultraviolet spectrum (ethanol) had $\lambda_{max.}$ 234 and 346 m$\mu$ ($\epsilon$=26,150 and 2,050, respectively) with inflections as 211, 253 and 275 m$\mu$ ($\epsilon$=37,050, 19,650 and 10,200, respectively).

*Analysis.*—Calcd. for $C_{16}H_{13}Cl_2N_3O$ (percent): C, 57.50; H, 3.92; Cl, 21.22; N, 12.57. Found (percent): C, 57.17; H, 4.00; Cl, 21.44; N, 12.35.

EXAMPLE 11

*[(7-chloro-5-phenyl-3H-1,4-benzodiapine-2-yl)aminooxy]acetic acid*

In the manner given in Example 1, 7-chloro-1,3-dihydro-5-phenyl-2H-1,4-benzodiazepine-2-thione and aminooxyacetic acid were refluxed methanol for 6 hours to give [(7 - chloro-5-phenyl-3H-1,4-benzodiazepine-2-yl)aminooxy]acetic acid.

EXAMPLE 12

*2-(ethoxyamino)-7-bromo-5-phenyl-3H-1,4-benzodiazepine*

In the manner given in Example 1, 7-bromo-1,3-dihydro-5-phenyl-2H-1,4-benzodiazepine - 2 - thione, ethoxyamine hydrochloride, sodium bicarbonate and methanol were refluxed for 6 hours to give 2-(ethoxyamino)-7-bromo-5-phenyl-H-1,4-benzodiazepine.

EXAMPLE 13

*2-(butoxyamino)-7-trifluoromethyl-5-(o-chlorophenyl)-3H-1,4-benzodiazepine*

In the manner given in Example 1, 7-trifluoromethyl-1,3-dihydro-5-(o - chlorophenyl)-2H-1,4-benzodiazepine-2-thione, butoxyamine hydrochloride, sodium bicarbonate and methanol were refluxed for 6 hours to give 2-(butoxyamino)-7-trifluoromethyl-5-(o - chlorophenyl)-3H-1,4-benzodiazepine.

EXAMPLE 14

*2-[3-(1-pyrrolidinyl)propoxyamino]-7-cyano-5-(o-fluorophenyl)-3H-1,4-benzodiazepine*

In the manner given in Example 1, 7-cyano-1,3-dihydro-5-(o - fluorophenyl)-2H-1,4-benzodiazepine-2-thione, 3-(1-pyrrolidinyl)propoxyamine hydrochloride, sodium bicarbonate and methanol were refluxed for 6 hours to give 2-[3-(1 - pyrrolidinyl)propoxyamino]-7-cyano-5-(o-fluorophenyl)-3H-1,4-benzodiazepine.

EXAMPLE 15

*2-[2-(1-piperidinyl)ethoxyamino]-7-nitro-5-(o-bromophenyl)-3H-1,4-benzodiazepine*

In the manner given in Example 1, 7-nitro-1,3-dihydro-5-(o - bromophenyl)2H-1,4-benzodiazepine-2-thione, 2-(1-piperidinyl)ethoxyamine hydrochloride, sodium bicarbonate and methanol were refluxed for 6 hours to give 2-[2-(1-piperidinyl)ethoxyamino] - 7 - nitro-5-(o-bromophenyl)-3H-1,4-benzodiazepine.

EXAMPLE 16

*2-(hydroxyamino)-7-fluoro-5phenyl-3H-1,4-benzodiazepine*

In the manner given in Example 1, 7-fluoro-1,3-dihydro-5-phenyl-2H-1,4-benzodiazepine - 2 - thione, hydroxyamine hydrochloride, potassium bicarbonate and ethanol were refluxed for 6 hours to give 2-(hydroxyamino)-7-fluoro-5-phenyl-3H-1,4-benzodiazepine.

EXAMPLE 17

*2-(crotyloxyamino)-5-phenyl-3H-1,4-benzodiazepine*

In the manner given in Example 1, 1,3-dihydro-5-phenyl-2H-1,4-benzodiazepine-2-thione, crotyloxyamine hydrochloride, sodium bicarbonate and methanol were refluxed for 6 hours to give 2-(crotyloxyamino)-5-phenyl-3H-1,4-benzodiazepine.

EXAMPLE 18

*2-(propoxyamino)-7-methyl-5-(o-fluorophenyl)-3H-1,4-benzodiazepine*

In the manner given in Example 1, 7-methyl-1,3-dihydro-5-(o - fluorophenyl)-2H-1,4-benzodiazepine-2-thione, propoxyamine hydrochloride, sodium bicarbonate and methanol were refluxed for 6 hours to give 2-(propoxyamino)-7-methyl-5-(o - fluorophenyl)3H-1,4-benzodiazepine.

EXAMPLE 19

*2-[3-(dimethylamino)propoxyamino]-7-trifluoromethyl-5-(o-chlorophenyl)-3H-1,4-benzodiazepine*

In the manner given in Example 1, 7-trifluoromethyl-1,3-dihydro-5-(o - chlorophenyl)-2H-1,4-benzodiazepine-2 - thione, 3 - (dimethylamino)propoxyamine hydrochloride, sodium bicarbonate and methanol were refluxed for 6 hours to give 2-[3-(dimethylamino)propoxyamino]-7-trifluoromethyl-5-(o-chlorophenyl-3H-1,4-benzodiazepine.

EXAMPLE 20

*3-[(7-fluoro-5-phenyl-3H-1,4-benzodiazepin-2-yl)-aminooxy]propionic acid*

In the manner given in Example 11, 7-fluoro-1,3-dihydro-5-phenyl-2H-1,4-benzodiazepine-2-thione, 3-(aminooxy)propionic acid and methanol were refluxed for 6 hours to give 2-[(7-fluoro-5-phenyl-3H-1,4-benzodiazepin-2-yl)aminooxy]propionic acid.

EXAMPLE 21

*Methyl[(7-bromo-5-phenyl-3H-1,4-benzodiazepin-2-yl)aminooxy]acetate*

In the manner given in Example 7, 7-bromo-1,3-dihydro - 5 - phenyl-2H-1,4-benzodiazepine-2-thione, methyl aminooxyacetate, dimethyl sulfoxide and methanol were refluxed for 6 hours to give methyl[7-bromo-5-phenyl-3H-1,4-benzodiazepin-2-yl)aminooxy]acetate.

EXAMPLE 22

*2-(isobutoxyamino)-7-cyano-5-phenyl-3H-1,4-benzodiazepine*

In the manner given in Example 1, 7-cyano-1,3-dihydro-5-phenyl-2H-1,4-benzodiazepine-2-thione, isobutoxyamine hydrochloride, sodium bicarbonate and methanol were refluxed for 6 hours to give 2-(isobutoxyamino)-7-cyano-5-phenyl-3H-1,4-benzodiazepine.

EXAMPLE 23

*2-[(allyloxy)amino]-7-nitro-5-(o-chlorophenyl)-3H-1,4-benzodiazepine*

A mixture of 2 g. (0.006 mole) of 7-nitro-1,3-dihydro-5-(o-chlorophenyl)-2H-1,4-benzodiazepine-2-thione, 1.50 g. (0.013 mole) of allyloxyamine hydrochloride and 1.29 g. of sodium bicarbonate in 70 ml. of ethanol was brought to reflux and kept at reflux for 10 hours. Nitrogen gas was bubbled through the solution. The solution was then evaporated to give a residue which was dissolved in 75 ml. of methylene chloride. The methylene chloride solution was filtered through activated charcoal and evaporated to dryness giving 1.5 g. of a yellow-orange compound which was crystallized from cyclohexane and ethyl acetate and Skellysole B hexanes to give a total of 1.1 g. of 2 - [(allyloxy)amino]-7-nitro-5-(o-chlorophenyl)-3H-1,4-benzodiazepine of melting point 178–180°.

*Analysis.*—Calcd. for $C_{18}H_{15}ClN_4O_3$ (percent): C, 58.38; H, 4.05; N, 15.15; Cl, 9.46. Found (percent): C, 58.65; H, 4.31; N, 14.98; Cl, 9.44.

EXAMPLE 24

*2-[(allyloxy)amino]-5-(o-chlorophenyl)-3H-1,4-benzodiazepine*

In the manner given in Example 5, a mixture of 1,3-dihydro - 5 - (o-chlorophenyl)-2H-1,4-benzodiazepine-2-thione, allyloxyamine hydrochloride, sodium bicarbonate, and methanol was refluxed to give 2-[(allyloxy)amino]-5-(o-chlorophenyl)-3H-1,4-benzodiazepine.

EXAMPLE 25

*2-[(allyloxy)amino]-5-(2,6-dichlorophenyl)-3H-1,4-benzodiazepine*

In the manner given in Example 5 a mixture of 1,3-dihydro - 5 - (2,6-dichlorophenyl)-2H-1,4-benzodiazepine-2-thione, allyloxyamine hydrochloride, sodium bicarbonate, and methanol was refluxed to give 2-[(allyloxy)-amino]-5-(2,6-dichlorophenyl)-3H-1,4-benzodiazepine.

EXAMPLE 26

2-[(allyloxy)amino]-5-(2,6-difluorophenyl)-3H-1,4-benzodiazepine

In the manner given in Example 5, a mixture of 1,3-dihydro - 5 - (2,6-difluorophenyl)-2H-1,4-benzodiazepine-2-thione, allyloxyamine hydrochloride, sodium bicarbonate, and methanol was refluxed to give 2-[(allyloxy)-amino]-5-(2,6-difluorophenyl)-3H-1,4-benzodiazepine.

EXAMPLE 27

2-[(allyloxy)amino]-5-(o-fluorophenyl)-3H-1,4-benzodiazepine

In the manner given in Example 5, a mixture of 1,3-dihydro - 5 - (o-fluorophenyl) - 2H-1,4-benzodiazepine-2-thione, allyloxyamine hydrochloride, sodium bicarbonate, and methanol was refluxed to give 2-[(allyloxy)amino]-5-(o-fluorophenyl)-3H-1,4-benzodiazepine.

EXAMPLE 28

7,9-dichloro-2-(methoxyamino)-5-(2,6-dichlorophenyl)-3H-1,4-benzodiazepine

In the manner given in Example 1, a mixture of 7,9-dichloro - 1,3 - dihydro - 5 - (2,6-dichlorophenyl)-2H-1,4-benzodiazepine-2-thione, methoxyamine hydrochloride, sodium bicarbonate, and methanol was refluxed to give 7,9 - dichloro-2-(methoxyamino)-5-(2,6-dichlorophenyl)-3H-1,4-benzodiazepine.

EXAMPLE 29

6,7-dicyano-2-(thoxyamino)-5-(m-nitrophenyl)-3H-1,4-benzodiazepine

In the manner given in Example 1, a mixture of 6,7-dicyano - 1,3-dihydro-5-(m-nitrophenyl)-2H-1,4-benzodiazepine-2-thione, ethoxyamine hydrochloride, and sodium bicarbonate was refluxed in methanol to give 6,7-dicyano-2 - (ethoxyamino) - 5 - (m-nitrophenyl)-3H-1,4-benzodiazepine.

EXAMPLE 30

2-(t-butoxyamino)-7,9-dichloro-5-(2,6-dichlorophenyl)-3H-1,4-benzodiazepine

In the manner given in Example 1, a mixture of 7,9-dichloro - 1,3-dihydro-5-(2,6-dichlorophenyl)-2H-1,4-benzodiazepine-2-thione, 5-butoxyamine hydrochloride, and sodium bicarbonate was refluxed in methanol to give 2-(t-butoxyamino) - 7,9 - dichloro-5-(2,6-dichlorophenyl)-3H-1,4-benzodiazepine.

EXAMPLE 31

2-(propoxyamino)-6-methyl-7-bromo-5-(p-methylphenyl)-3H-1,4-benzodiazepine

In the manner given in Example 1, a mixture of 6-methyl - 7-bromo-1,3-dihydro-5-(p-methylphenyl)-2H-1,4-benzodiazepine-2-thione, propoxyamine hydrochloride and sodium bicarbonate was refluxed in methanol to give 2-(propoxyamino) - 6-methyl-7-bromo-5-(p-methylphenyl)-3H-1,4-benzodiazepine.

EXAMPLE 32

2-[(allyloxy)amino]-7-trifluoromethyl-8-cyano-5-(2-chloro-5-methylphenyl)-3H-1,4-benzodiazepine In the manner given in Example 5, a mixture of 1,3-dihydro - 7 - trifluoromethyl-8-cyano-5-(2-chloro-5-methylphenyl) - 2H-1,4-benzodiazepine-2-thione, allyloxyamine hydrochloride and sodium bicarbonate was refluxed in methanol to give 2-[(allyloxy)amino]-7-trifluoromethyl-8-cyano - 5 - (2-chloro-5-methylphenyl)-3H-1,4-benzodiazepine.

EXAMPLE 33

2-[3-(diethylamino)propoxyamino]-7,9-dicyano-5-(2,4-dibromophenyl)3H-1,4-benzodiazepine In the manner given in Example 1, a mixture of 1,3-dihydro - 7,9-dicyano-5-(2,4-dibromophenyl)-2H-1,4-benzodiazepine-2-thione, 3-(diethylamino)propoxyamine hydrochloride and sodium bicarbonate was refluxed in methanol to give 2-[3-(diethylamino)propoxyamino]-7,9-dicyano-5-(2,4-dibromophenyl)-3H-1,4-benzodiazepine.

EXAMPLE 34

2-[(allyloxy)amino-8-nitro-5-(o-chlorophenyl)-3H-1,4-benzodiazepine

In the manner given in Example 5, a mixture of 8-nitro - 1,3 - dihydro-5-(o-chlorophenyl)-2H-1,4-benzodiazepine-2-thione, allyloxyamine hydrochloride, and sodium bicarbonate was refluxed in methanol to give 2-[(allyloxy)amino] - 8 - nitro-5-(o-chlorophenyl-3H-1,4-benzodiazepine.

EXAMPLE 35

2-(isopropoxyamino)-7-chloro-5-(2-chloro-4-methylphenyl)-3H-1,4-benzadiazepine In the manner given in Example 1, a mixture of 7-chloro - 1,3 - dihydro-5-(2-chloro-4-methylphenyl)-2H-1,4 - benzodiazepine - 2 - thione, isopropoxyamine hydrochloride, and sodium bicarbonate was refluxed in methanol to give 2 - (isopropoxyamino) - 7 - chloro-5-(2-chloro-5-methylphenyl)-3H-1,4-benzodiazepine.

EXAMPLE 36

2-[(benzyloxy)amino]-6,8-dimethyl-5-(3,5-diethoxyphenyl)-3H-1,4-benzodiazepine In the manner given in Example 1, a mixture of 6,8-dimethyl - 1,3 - dihydro - 5 - (3,5 - diethoxyphenyl) - 2H-1,4 - benzodiazepine - 2 - thione, benzyloxyamine hydrochloride, and sodium bicarbonate was refluxed in methanol to give 2-[(benzyloxy)-amino]-6,8-dimethyl-5-(3,5-diethoxyphenyl)-3H-1,4-benzodiazepine.

EXAMPLE 37

2-[(allyloxy)amino]-7-ethyl-5-(o-butylphenyl)-2H-1,4-benzodiazepine

In the manner given in Example 5, a mixture of 1,3-dihydro - 7 - ethyl - 5 - (o-butylphenyl)-2H-1,4-benzodiazepine - 2 - thione, allyloxyamine hydrochloride and sodium bicarbonate was refluxed to give 2-[(allyloxy)amino] - 7 - ethyl - 5 - (o-butylphenyl) - 2H - 1,4-benzodiazepine.

EXAMPLE 38

2-[(allyloxy)amino]-7,8-dipropyl-5-(o-methylthiophenyl)-2H-1,4-benzodiazepine In the manner given in Example 5, a mixture of 1,3-dihydro-7,8-dipropyl - 5 - (o-methylthiophenyl) - 2H - 1,4- benzodiazepine - 2 - thione, allyloxyamine hydrochloride and sodium bicarbonate was refluxed to give 2-[(allyloxy)amino] - 7,8 - dipropyl - 5 - (o-methylthiophenyl) 2H - 1,4 - benzodiazepine.

EXAMPLE 39

6-butylthio-2-(ethoxyamino)-5-(p-propoxyphenyl)-2H-1,4-benzodiazepine

In the manner given in Example 1, a mixture of 1,3-dihydro - 6 - butylthio - 5 - (p-propoxyphenyl)-2H-1,4-benzodiazepine - 2 - thione, ethoxyamine hydrochloride and sodium bicarbonate was refluxed to give 6-butylthio-2 - (ethoxyamino) - 5 - (p-propoxyphenyl - 2H - 1,4- benzodiazepine.

EXAMPLE 40

*2-[(allyloxy)amino]-9-methylthio-7-bromo-5-(3,5-difluorophenyl)-2H-1,4-benzodiazepine*

In the manner given in Example 1, a mixture of 1,3-dihydro-7-bromo-9-methylthio-5-(3,5-difluorophenyl)-2H-1,4-benzodiazepine-2-thione, allyloxyamine hydrochloride and sodium bicarbonate was refluxed to give 2-[(allyloxy)amino]-9-methylthio-7-bromo-5-(3,5-difluorophenyl)-2H-1,4-benzodiazepine.

EXAMPLE 41

*9-isopropyl-7-nitro-2-[(allyloxy)amino]-5-[2,6-bis(ethylthio)phenyl]-2H-1,4-benzodiazepine*

In the manner given in Example 1, a mixture of 1,3-dihydro-9-isopropyl-7-nitro-5-[2,6-bis(ethylthio)phenyl]-2H-1,4-benzodiazepine-2-thione, allyloxyamine hydrochloride and sodium carbonate was refluxed to give 2-[(allyloxy)amino]-5-[2,6-bis(ethylthio)phenyl]-2H-1,4-benzodiazepine.

In the manner given in the preceding examples, other 3H-1,4-benzodiazepines of Formula II are obtained by treating 2H-1,4-benzodiazepine-2-thiones of Formula I with an oxyamino compound $H_2N$—OR, wherein R is defined as above. Representative compounds of Formula II, thus obtained include:

2-(allyloxyamino)-7-bromo-5-phenyl-3H-1,4-benzodiazepine;
2-[(3-butenyloxy)amino]-7-trifluoromethyl-5-(o-chlorophenyl)-3H-1,4-benzodiazepine;
2-(isopropoxyamino)-7-butyl-5-phenyl-3H-1,4-benzodiazepine;
2-(benzyloxyamino)-7-fluoro-5-(o-bromophenyl)-3H-1,4-benzodiazepine;
2-(ethoxyamino)-7-chloro-5-(o-fluorophenyl)-3H-1,4-benzodiazepine;
2-(propoxyamino)-7-cyano-5-phenyl-3H-1,4-benzodiazepine;
2-(butoxyamino)-7-nitro-5-phenyl-3H-1,4-benzodiazepine;
2-(isopropoxyamino)-5-(o-bromophenyl)-3H-1,4-benzodiazepine;
2-[3-(1-piperidinyl)propoxyamino]-5-phenyl-3H-1,4-benzodiazepine;
2-[2-(dimethylamino)ethoxyamino]-5-(o-fluorophenyl)-3H-1,4-benzodiazepine;
2-(allyloxyamino)-7-nitro-5-phenyl-3H-1,4-benzodiazepine;
2-hydroxyamino-7-cyano-5-(o-bromophenyl)-3H-1,4-benzodiazepine;
2-hydroxyamino-6,7-difluoro-5-[3,5-(trifluoromethyl)phenyl]-3H-1,4-benzodiazepine;
2-benzyloxyamino-7,9-dicyano-5-(2,4-dibromophenyl)-3H-1,4-benzodiazepine;
2-butoxyamino-6,7-dicyano-5-(m-nitrophenyl)-3H-1,4-benzodiazepine;
2-[(allyloxy)amino]-7,9-dichloro-5-(2,6-dihcloro-phenyl)-3H-1,4-benzodiazepine;
2-[(crotyloxy)amino]-7,9-dichloro-5-(2,6-dichlorophenyl)-3H-1,4-benzodiazepine;

and the like.

Acid addition salts of compounds of Formula II are obtained by reacting the selected compound of Formula II with one or more equivalent of acid to get the desired acid addition salt. The reaction is carried out at zero to 25° C. in a solvent, for example, ether, ethyl acetate, anhydrous or aqueous methanol, ethanol, or isopropanol, and the solvent is thereupon evaporated. In this manner, pharmacologically acceptable acid addition salts, e.g., hydrochlorides, hydrobromides, sulfates, phosphates, acetates, propionates, tartrates, succinates, lactates, citrates, maleates, malates, phenylacetates, phenylpropionates, benzoates, cinnamates, salicylates, cyclohexanesulfonates, pamoates, methanesulfonates and the like of Formula II compounds are obtained.

What is claimed is:
1. A 3H-1,4-benzodiazepine of the formula:

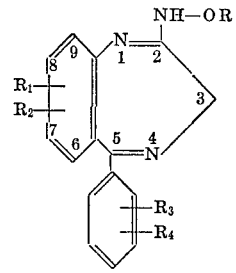

wherein R is selected from the group consisting of hydrogen, lower-alkyl of 1 to 4 carbon atoms, inclusive, lower-alkenyl of 3 or 4 carbon atoms, benzyl, —$H_2CCOOH$ and —$(CH_2)_2COOH$ and the esters thereof derived from an alkanol of 1 to 3 carbon atoms, inclusive, and

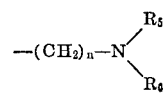

in which $n$ is 2 or 3 or

together signify the pyrrolidino or piperidino radical; and wherein $R_1$, $R_2$, $R_3$, and $R_4$ are selected from the group consisting of hydrogen, lower alkoxy of 1 to 3 carbon atoms, inclusive, alkyl defined as above, alkylthio in which the alkyl group is defined as above, halogen, nitro, cyano and $CF_3$; and the pharmacologically acceptable acid addition salts thereof.

2. A compound according to claim 1 wherein $R_1$ is 7-chloro, $R_2$, $R_3$, and $R_4$ are hydrogen and R is methyl and the compound is therefore 2-(methoxyamino)-7-chloro-5-phenyl-3H-1,4-benzodiazepine.

3. A compound according to claim 1 wherein $R_1$ is 7-chloro, $R_2$, $R_3$, and $R_4$ are hydrogen and R is benzyl and the compound is therefore 2-(benzyloxyamino)-7-chloro-5-phenyl-3H-1,4-benzodiazepine.

4. A compound according to claim 1 wherein $R_1$ is 7-chloro, $R_2$, $R_3$, and $R_4$ are hydrogen and R is 2-(1-pyrrolidinyl)ethyl and the compound is therefore 2-[2-(1-pyrrolidinyl)ethoxyamino]-7-chloro-5-phenyl-3H-1,4-benzodiazepine.

5. A compound according to claim 1 wherein $R_1$ is 7-chloro, $R_2$, $R_3$, and $R_4$ are hydrogen and R is t-butyl and the compound is therefore 2-(t-butoxyamino)-7-chloro-5-phenyl-3H-1,4-benzodiazepine.

6. A compound according to claim 1 wherein $R_1$ is 7-chloro, $R_2$, $R_3$, and $R_4$ are hydrogen and R is allyl and the compound is therefore 2-(allyloxyamino)-7-chloro-5-phenyl-3H-1,4-benzodiazepine.

7. A compound according to claim 1 wherein $R_1$ is 7-chloro, $R_2$, $R_3$, and $R_4$ are hydrogen and R is 2-(diethylamino)ethyl and the compound is therefore 2-[2-diethylamino)ethoxyamino]-7-chloro-5-phenyl-3H-1,4-benzodiazepine.

8. A compound according to claim 1 wherein $R_1$ is 7-chlor, $R_2$, $R_3$, and $R_4$ are hydrogen and R is

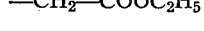
—$CH_2$—$COOC_2H_5$ and the compound is therefore ethyl [(7-chloro-5-phenyl-3H11,4-benzodiazepin-2-yl)aminooxy]acetate.

9. A compound according to claim 1 wherein $R_1$ is 7-chloro, R, $R_2$, $R_3$, and $R_4$ are hydrogen and the compound is therefore 2-(hydroxyamino)-7-chloro-5-phenyl-3H-1,4-benzodiazepine.

10. A compound according to claim 1 wherein $R_1$ is 7-chloro, and $R_3$ is o-chloro, $R_2$ and $R_4$ are hydrogen, and R is allyl and the compound is therefore 2-(allyloxyamino) - 7 - chloro - 5 - (o-chlorophenyl)-3H-1,4-benzodiazepine.

11. A compound according to claim 1 wherein $R_1$ is 7-chloro, and $R_3$ is o-chloro, $R_2$ and $R_4$ are hydrogen and R is methyl and the compound is therefore 2-(methoxyamino) - 7 - chloro - 5 - (o-chlorophenyl)-3H-1,4-benzodiazepine.

12. A compound according to claim 1 wherein $R_1$ is 7-nitro $R_2$ and $R_3$ are hydrogen and $R_4$ is o-chloro and R is allyl and the compound is thus 2-[(allyloxy)amino]-7-nitro-5-(o-chlorophenyl)-3H-1,4-benzodiazepine.

13. A compound according to claim 1 wherein $R_1$, $R_2$, and $R_4$ are hydrogen, $R_3$ is o-chloro and R is allyl, and the compound is thus 2-[(allyloxy)amino-5-(o-chlorophenyl)-3H-1,4-benzodiazepine.

References Cited

UNITED STATES PATENTS

| | | | |
|---|---|---|---|
| 3,422,091 | 1/1969 | Archer et al. | 260—239 |
| 3,455,916 | 7/1969 | Green et al. | 260—583 |
| 3,491,151 | 1/1970 | Bader | 260—583 |

FOREIGN PATENTS

| | | | |
|---|---|---|---|
| 956,592 | 4/1964 | Great Britain | 260—239 |

ALTON D. ROLLINS, Primary Examiner

U.S. Cl. X.R.

71—88, 94, 95; 260—239.3 D, 293.4 R, 293.4 A, 294.7 G, 326.5 S, 326.5 G; 424—184, 232, 244, 267, 274

UNITED STATES PATENT OFFICE
CERTIFICATE OF CORRECTION

Patent No. 3,649,617                               Dated March 14, 1972

Inventor(s) Jackson B. Hester, Jr.

It is certified that error appears in the above-identified patent and that said Letters Patent are hereby corrected as shown below:

Column 2, line 31, for "or $R_5$ or $R_6$" read -- or $R_5$ and $R_6$ - line 32, for "of 4 to 5" read -- of 4 or 5 --; line 38, for "oxylamine" read -- oxyamine --; line 47, for "fo alkenyl" read -- of alkenyl --. Column 3, line 29, for "methoxyamino-7-" read -- methoxyamino)-7- --; line 40, for "alloyloxyamino" read -- allyloxyamino --; line 40, for "chlorophenyl-3H-" read -- chlorophenyl)-3H- --; line 65, for "dried fishmeal" read -- dried fishmeal --. Column 4, line 10, for "benzodiazepine-2-one read -- benzodiazepin-2-ones --; line 43, for "1,3-ldihydro" rea -- 1,3-dihydro --; line 55, for ")2H-1,4-" read -- )-2H-1,4- --. Column 6, line 1, for "[2-1-" read -- [2-(1- --; line 17, for "2-(Butoxyamino" read -- 2-(t-Butoxyamino --. Column 7, line 34 for "($\epsilon$=34,560)," read -- ($\epsilon$=34,560), --. Column 8, line 12, for "38.750" read -- 38,750 --; line 55, for "2-methoxyamino)" read -- 2-(methoxyamino) --; line 69, for "benzodiapine" read -- benzo diazepine --; line 73, for "refluxed methanol" read -- refluxed in methanol --; line 74, for "benzodiazepine" read -- benzodiaze pin --. Column 9, line 9, for "-H-1,4-" read -- -3H-1,4- --; line 35, for ")2H-1,4-" read -- )-2H-1,4- --; line 42, for "5phenyl" read -- 5-phenyl --; line 65, for ")3H-1,4-" read -- )-3H-1,4- --. Column 10, line 19, for "[7-" read -- [(7- -- Column 11, line 34, for "(thoxyamino)" read -- (ethoxyamino) --. Column 12, line 3, for ")3H-1,4-" read -- )-3H-1,4- --; line 24, for "benzadiazepine" read -- benzodiazepine --; line 74, for "propoxypheny -2H-" read -- propoxyphenyl)-2H- --. Column 13, line 58, for "dihlorophenyl" read -- dichlorophenyl --; line 66, for "equivalent" read -- equivalents --. Column 14, line 61, for "2-2-" read -- 2-[2-( --.

Signed and sealed this 26th day of September 1972.

(SEAL)
Attest:

EDWARD M. FLETCHER, JR.
Attesting Officer

ROBERT GOTTSCHALK
Commissioner of Patent